United States Patent Office 3,517,435

Patented June 30, 1970

3,517,435
METHOD OF PRODUCING SEMICONDUCTOR MATERIALS

Ernst W. S. Winkler, John R. Emmett, and John A. Perry, Ottawa, Ontario, Canada, assignors to Canadian Patents and Development Limited, Ottawa, Ontario, Canada, a corporation of Canada No Drawing. Filed Sept. 1, 1967, Ser. No. 664,946
Int. Cl. H01v 49/00
U.S. Cl. 29—573 3 Claims

ABSTRACT OF THE DISCLOSURE

A method for compacting thermoelectric semiconductor material to provide anisotropic properties by enclosing the material in powdered form in a ductile sheath. The sheath is then compressed by repeated swaging or drawing to compact the semiconductor material and the sheath or a portion of it is subsequently removed.

This invention relates to a method for producing compacted semiconductor materials and, in particular, it relates to the production of thermoelectric materials, such as bismuth telluride, having desirable anisotropic properties.

The intermetallic semiconductor compounds are, in general, brittle and difficult to fabricate into desired shapes. In addition, for use in certain thermoelectric devices, it may be desirable that the material should be anisotropic having a high value of Seebeck coefficient along one axis and a low value of electrical resistance along another axis.

Hitherto known processes for producing thermoelectric material have included the following: (1) the zone melting and casting of nearly single crystals; (2) mechanical compacting of powder with subsequent sintering and (3) extrusion of material heated to a plastic condition. In regard to the first process, that of zone melting, it produces a product which is easily cleaved along crystal planes. In particular, bismuth telluride crystals have weak bonding between adjacent tellurium planes leading to poor mechanical properties. The second method, that of mechanical compacting, has the disadvantage of producing a porous product resulting in low mechanical strength and susceptibility to "poisoning" by atmospheric oxidation. The third method, in addition to the disadvantage of the additional complexity of the heating elements required has a disadvantage in common with the second method in that the resulting product is isotropic and thus lacking in the preferred orientation discussed above.

The process of this invention produces the thermoelectric material in anisotropic form by repeated swaging of the powdered material. The powdered thermoelectric material is encased in a ductile metallic or plastic sheath prior to swaging. Desirably, the sheathing is evacuated before and during swaging in order to prevent the formation of voids or bubbles in the final material. The material and sheath are then reduced in the absence of external heat to form a narrow rod or wire of the material sheath in metal or plastic. In other words, in the swaging apparatus the sheath is exposed to ambient temperature. The metallic or plastic sheath serves a dual function, acting as a lubricant during the swaging process and as a mechanical restraint on the strained core so produced. This mechanical restraint gives the desired tri-axial loading and aids in preventing break-up of the strained core after forming.

In the process of this invention no external source of heat is used but instead the redundant energy of deformation is used to weld the particles of the powder into a compact mass. It is found that the swaged rod has directional properties, a high density, low electrical resisitivity and a high Seeback coefficient. The process of this invention may be further extended by the steps of wire drawing, rolling or deep drawing the compacted rod.

One embodiment of the process according to this invention starts with a semiconductor material, such as bismuth telluride, in powder form filling aluminum tubing of, for instance, ¾" diameter. This tubing is then reduced by a swaging machine to less than ¾" diameter with a consequent increase in the length of the tubing and the compactness of the material. Further swaging steps are then performed to give a reduction to for example ½" diameter followed by similar swaging steps down to the final required size. The sheathing is evacuated before and during the swaging process. The sheath can then be removed to obtain the compacted semiconductor material or make electrical or thermal contacts with the material.

The process may be modified by introducing a layer of dielectric material between the semiconductor powder and the sheath prior to swaging. This avoids electrical or chemical action between the semiconductor material and the outer sheath and facilitates the removal of the sheath after swaging.

The removal of the sheath form the compacted semiconductor material may be facilitated by including the additional step of annealing the compacted rod, at a temperature below the oxidation temperature of the semiconductor, prior to removal of the sheath. For compacted bismuth telluride the swaged tube may be annealed at 325° C. for 20 minutes.

The sequence of swaging steps may be replaced or extended by a sequence of drawing steps in which the sheathed semiconductor is reduced in size by being drawn through a sequence of dies of decreasing diameter. The compacted bar produced by swaging or drawing may be further treated by rolling to provide the semiconductor in a flattened, strip shape.

It may be desirable to remove only a portion of the sheath surrounding the compacted semiconductor material leaving the remainder to form electrical contacts with the semiconductor material.

The ductile sheath is, preferably, formed from aluminum, tin, copper or lead although other ductile materials may be used. Alternatively, a non-metallic ductile plastic may be used to form the ductile sheath. The sheath material must meet the requirement of having a sheath greater than that of the work-hardened semiconductor material. Preferred materials for the intermediate dielectric layer are magnesia, alumina and deformable plastics.

The process of this invention has particular utility in the production of bismuth telluride for thermoelectric applications. The bismuth telluride so produced has a low value of resistivity and a high value of Seebeck coefficient as is necessary for efficient thermoelectric devices. In addition, the bismuth telluride produced by this process displays marked anisotropic properties such as have been obtained hitherto only by cold working a cast material. This is attributable to the use of the energy of deformation to weld the particles togeher (without any recrystallization) and is introduced by heavy relative motion of the particles one upon another while in close contact. Such an effect would not be produced if the material had been pre-heated to a plastic condition. The technique of this invention has been referred to as "weld-forming of powder."

The following examples are illustrative of the utility of the process of this invention.

EXAMPLE I

A quantity of n-type bismuth telluride powder was weld-formed by repeated swaging according to the process of this invention. Samples were taken after each reduction in diameter and porosity, hardness, Seebeck coefficient and resistivity measured. These measurements are set out in the appended table. The porosity gives a measure of the density of the compacted material and the hardness gives a measure of its strength.

It can be seen from the table that the density and hardness increase with repeated swaging. In addition the resulting semiconductor material has an increased Seebeck coefficient and a reduced resistivity. The data for the second sample tabulated, that having undergone an area reduction of 175 on the logarithmic scale, leads to a figure of merit for a thermoelectric device of approximately 3.0. This figure of merit, Z, is derived from the formula $$Z=\alpha^2/\rho\lambda$$

where $\alpha$ is the Seebeck coefficient, $\rho$ the resistivity and $\lambda$ the thermal conductivity of the material, here assumed to be 0.0134 watt/cm. ° C.

The reduction in cross-sectional area to 300 and 500 as seen in the following table gave articles to thin for measurement of the Seebeck coefficient and resistivity with the equipment available.

TABLE

Properties of weld-formed bismuth telluride, n-type

| Reduction in cross-sectional area of sample, 100 ln $A_o/A_x$ | Porosity in percent of area | Hardness in HV15 (Vickers scale, 15 g. loading) | Seebeck coefficient in $\mu v/°$ C. | Resistivity in $\mu\Omega$ cm. |
|---|---|---|---|---|
| 100 | 2.8 | 40 | 215 | 2.0 |
| 175 | 1.0 | 45 | 230 | 1.2 |
| 250 | 0.5 | 50 | 235 | 1.1 |
| 300 | 0.45 | 52 | | |
| 500 | 0.45 | 60[1] | | |
| Properties of commercial n-type bismuth telluride produced by powder metallurgy | | | | |
| Compacted and sintered | 0.9 | 34 to 44.5 | 143 to 188 | 1.3 and 2.3 |

[1] Maximum.

NOTE: $A_o$=original area. $A_x$=reduced area.

EXAMPLE 2

Three samples of compacted, sheathed n-type bismuth telluride were produced from powder by repeated swaging to give an area reduction of 200 on the logarithmic scale. The resistivity was measured (a) in the direction of swaging action, i.e. normal to the longitudinal axis of the sample and (b) along the longitudinal axis of the sample. The corresponding measured value were (a) 2.3 to 2.4 to $2.4\times10^{-3}$ ohm cm. and (b) 1.9 to $2.2\times10^{-3}$ ohm cm. Thus the semi-conductor material displays anisotropic properties produced by the compacting process.

Sections were taken from the three samples and polished for metallographic examination. This examination revealed a definite orientation of the grain structure in the direction of swaging. This orientation is of the form commonly associated with directional electrical properties.

Thus, there has been disclosed a novel process for producing compacted semiconductor materials having desirable anisotropic properties. Possible variations in the process described will be apparent to those skilled in the art. For example, the semiconductor may be in solid as opposed to powder form at the start of the process. While the particular examples relating to the process have been described with relation to bismuth telluride, other semiconductor materials, such Ge-Te, Bi-Te-Se, can also be compacted by the process of this invention.

We claim:

1. A method for compacting a thermoelectric semiconductor powder to provide anisotropic properties comprising the steps of, providing a ductile sheath having an inner layer of dielectric material, said sheath having a yield strength greater than that of the semiconductor in work-hardened form, enclosing said powder in said ductile sheath with said layer of dielectric material interposed between said semiconductor material and said sheath, said powder fully occupying at least a portion of said sheath, evacuating the sheath, compressing said sheath and powder normal to the axis of said sheath to deform both sheath and powder, while maintaining the vacuum in said sheath, to produce a compact, high density semiconductor rod, the deformation of the sheath and powder being expressed by the relationship:

$$A_0/A_x \geqslant 2.7$$

where $A_0$ is the cross-sectional area of the powder before compression and $A_x$ is the cross-sectional area of the reduced material after compression, maintaining the outer surface of said sheath exposed to ambient temperature while under stress, and exposing a surface of the compacted semiconductor.

2. The method as defined in claim 1 wherein the compression of said sheath is performed by a sequence of swaging steps.

3. The method as defined in claim 1 wherein said dielectric material is selected from the group of magnesia, alumina and deformable plastics.

References Cited

UNITED STATES PATENTS

| | | | |
|---|---|---|---|
| 3,065,286 | 11/1962 | Connell | 29—573 |
| 3,220,199 | 11/1965 | Hanlein et al. | 29—573 |
| 3,281,921 | 11/1966 | Danko et al. | 29—573 |
| 3,285,786 | 11/1966 | Katz | 29—573 |
| 3,353,260 | 11/1967 | Davis et al. | 29—573 |
| 3,400,452 | 9/1968 | Emley | 29—573 |

FOREIGN PATENTS 854,570 11/1960 Great Britain.

PAUL M. COHEN, Primary Examiner

U.S. Cl. X.R.

29—420.5